Figure 1:
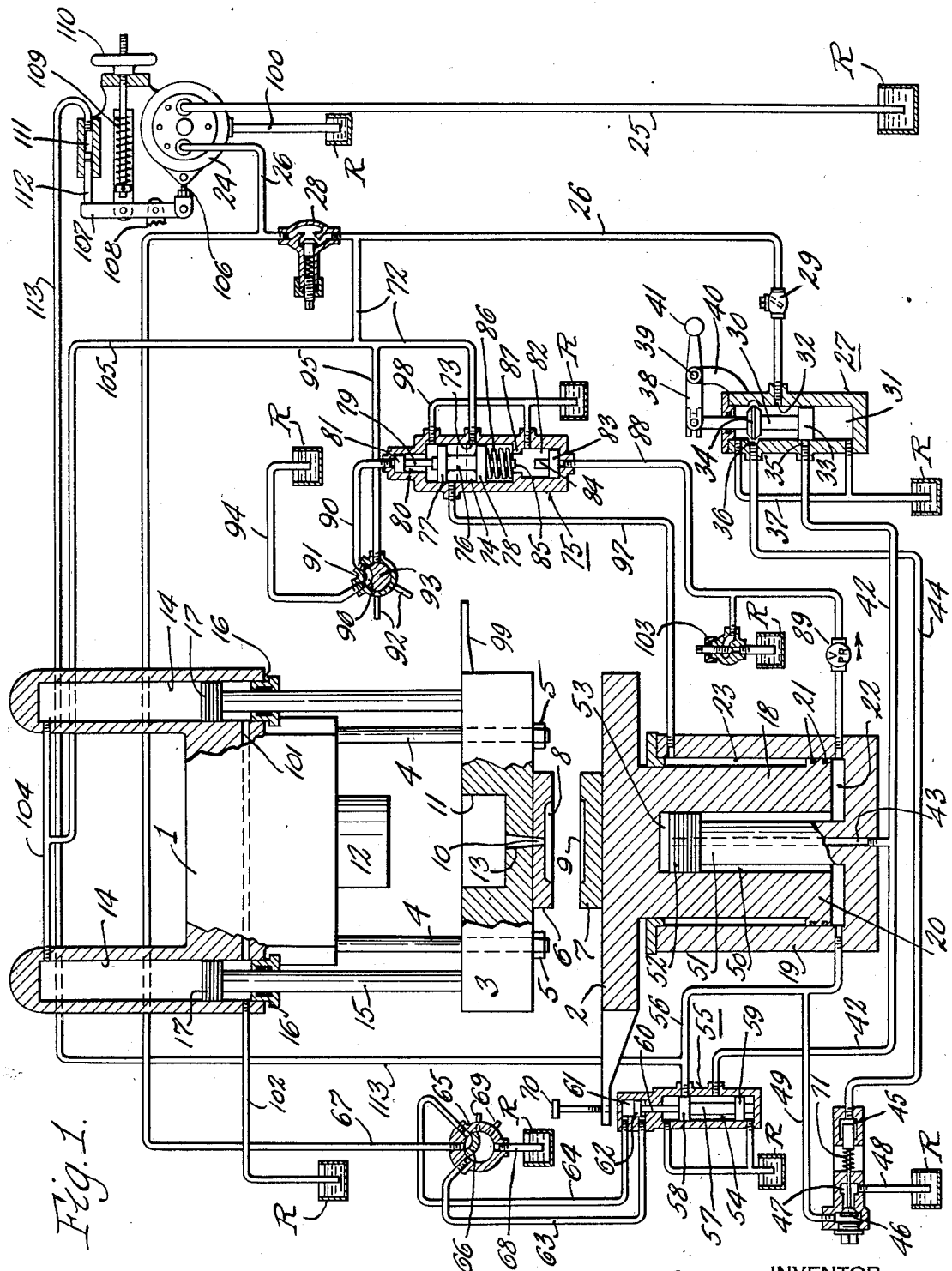

Nov. 20, 1945.  T. F. STACY  2,389,169
HYDRAULIC MOTOR
Filed May 20, 1942  2 Sheets-Sheet 1

INVENTOR
Thomas F. Stacy
BY
Parker, Hockwort & Farmer
ATTORNEYS

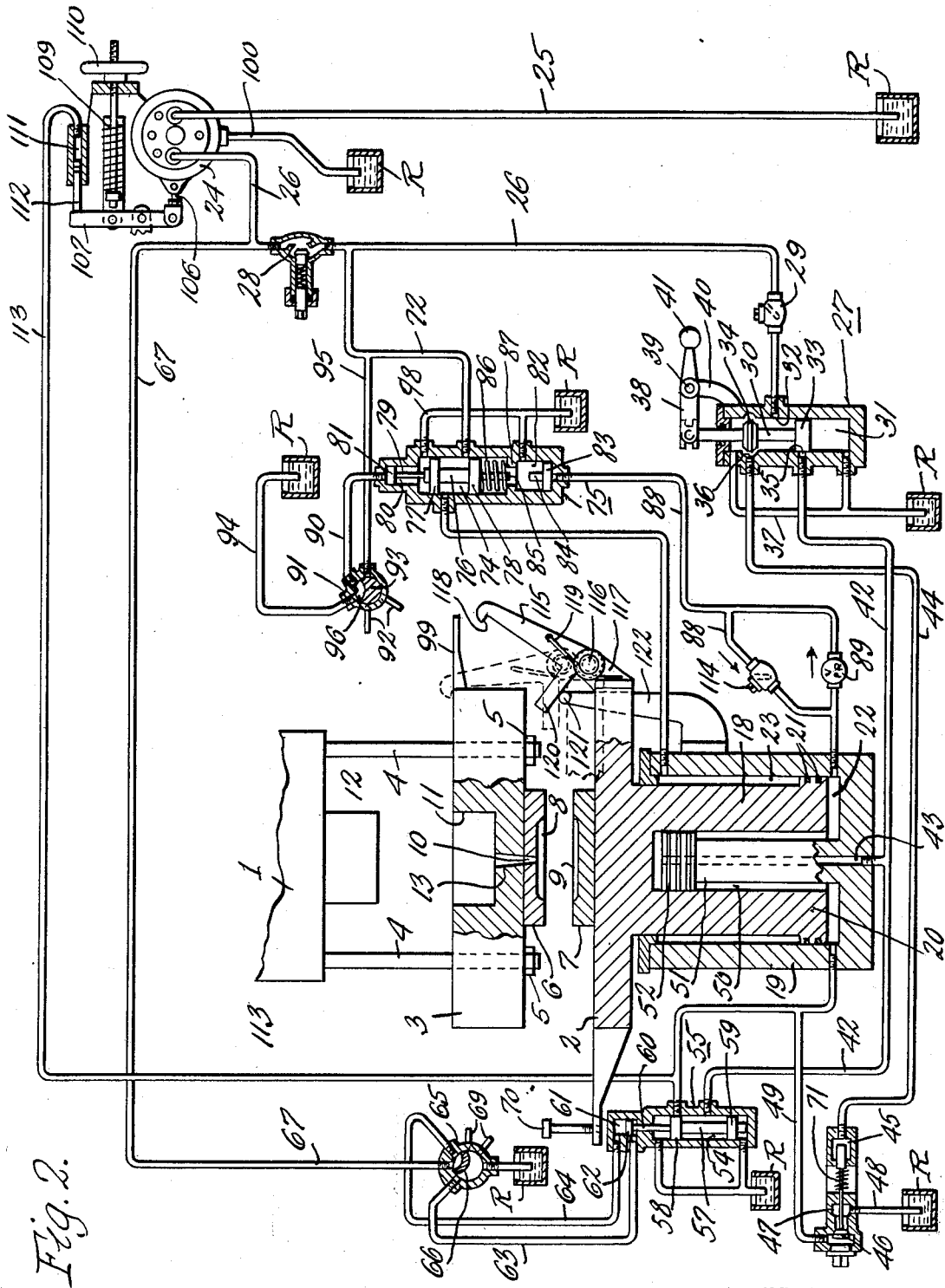

Patented Nov. 20, 1945

2,389,169

UNITED STATES PATENT OFFICE 2,389,169

HYDRAULIC MOTOR

Thomas F. Stacy, Piqua, Ohio, assignor to The French Oil Mill Machinery Company, Piqua, Ohio Application May 20, 1942, Serial No. 443,767

15 Claims. (Cl. 18—30)

This invention relates to hydraulic motors and particularly to the control of the movable parts of the motor. Motors of this type are commonly employed as parts of hydraulic presses in which material is subjected to extremely high pressure, often as high as 3,000 lbs. per square inch. When such high pressures are applied to one side of a piston head, the packing between the head and the cylinder in which the head reciprocates is subjected to a large pressure differential on opposite faces thereof. There is a strong tendency for the fluid under such high pressure to leak past the packing and cause damage to the packing, even when split metallic rings like the piston rings of a gas engine are employed as the packing. The leaking fluid in such cases causes wire drawing and damage to the rings. This wire drawing or other injury to the packing can be prevented by applying fluid under substantially the same pressure to both sides of the piston head and packing or rings and depending upon the difference in pressure areas on the opposite sides of the piston head to give the necessary force urging the platen in one direction. This opposing pressure however, if continuously effective, opposes the advance of the platen or movable element of the motor, which is objectionable especially during the part of the travel of the movable motor member where the pressure is not sufficiently high to endanger the packing.

An object of this invention is to provide improved means for preventing injury to the packing on the piston head of the motor when the extremely high pressures are applied to the piston head, which will not objectionably delay the advance of the motor member when the pressure is below that which may cause injury to the packing, and which will be simple, practical, easily applied to existing presses and inexpensive.

When hydraulic presses or motors are employed for the transfer molding of resinous materials it is important that the die sections be held closed after the molding operation until the injection piston has been withdrawn from the injection cylinder, or resistance to such removal has been substantially overcome, so that the mold sections shall not separate and then bang together with possible resulting injury thereto. To solve that problem heretofore, clamps have been provided between the floating mold section or member and the platen, effective during the portion of the travel of the platen while the injection piston is within the injection cylinder. Such clamps are automatically opened after the injection piston has been completely withdrawn from the injection cylinder in the floating member. Such clamps have also been relied upon to prevent separation of the mold sections by internal pressure during the molding operation, and if the clamps are tight enough to prevent a separation of the mold sections during a molding operation, the tightness interferes with the free release of the floating member during a retraction of the platen after a molding operation.

An object of this invention is to provide improved means for preventing separation of the mold sections during a molding operation due to internal pressure, which will make unnecessary the use of clamps for preventing separation of the mold sections due to internal pressure in the molds, which will prevent injury to the mold sections when, after a molding operation, the platen is returned to retraction position, which may be embodied in presses of this type without radical changes in their design, which will require a minimum of change in old apparatus and attachments, with which there need be no binding that would interfere with the retraction of the platen and opening of the mold, and which will be relatively simple, practical, durable, effective and inexpensive.

Other objects of the invention will be apparent from the following description of two embodiments of the invention, and the novel features will be particularly pointed out hereinafter in connection with the appended claims.

In the accompanying drawings:

Fig. 1 is a diagram representing a portion of a hydraulic transfer molding press, partly in section, and operating controls for the same, all in accordance with this invention, but with the pumps, pipes and valves illustrated schematically; and Fig. 2 is a similar diagram illustrating nonhydraulic means for preventing injury to the mold sections during a retraction operation, and also illustrating a modification in a hydraulic element forming a part of the control mechanism.

In the embodiment of the invention shown in Fig. 1, the hydraulic motor is in the nature of a hydraulic molding press of the transfer molding type, having a relatively fixed head 1, a platen 2, and an intermediate platen or member 3 which is slidingly mounted on rods 4 extending from the head 1, for movement toward and from the fixed head 1. Nuts 5 on the ends of the rods 4 connected to the head, limit the movement of the member 3 in a direction away from head 1. The member 3 is thus floatingly mounted on the rods 4 connected to the head, and supports, on its under side, one mold section 6. The platen 2 similarly supports on its upper face a mold section 7 aligned with the mold section 6. The sections 6 and 7 have in their adjacent faces complemental cavities 8 and 9 which together form a complete mold cavity with a sprue opening 10 in the mold section 6. The platen 2 descends below and separates from the member 3 when the latter is limited in descent by the rods 5, which causes a separation of the mold sections 6 and 7 and thus an opening of the mold.

The member 3 is provided in its upper face with an upwardly opening recess 11, which may be termed an injection cylinder, that receives an aligned injection piston 12 that depends or projects downwardly from the head, and which is of a size to enter and closely fit the recess 11. The bottom wall of the recess 11 is connected by the downwardly converging passage 13 with the sprue passage 10 in the mold section 6, and the sprue passage 10 is similarly downwardly converging to form a continuation of the converging passage 13. While the press is opened, as in Fig. 1, a molding material is placed in the recess 11 in a quantity slightly more than sufficient to fill the mold cavity and the passages 10 and 13. When the resinous materials are of the thermal setting type, the member 3 is provided near the recess 11 and passage 13 with heating means to heat the molding material sufficiently to render it fluid as it is compressed against the bottom wall of the recess 11 and forced through the passage 13. An example of such heating and molding is shown in U. S. Patent to Shaw 1,919,534, but, obviously other means for heating the resinous material during molding operation may be employed when heat is necessary.

Also mounted on the fixed head 1 are cylinders 14 into which piston rods 15 extend through suitable packing 16 in the lower ends of cylinders 14. Within the cylinders 14 the rods 15 terminate in piston heads 17. The rods 15 at their lower ends are connected to the member 3, or at least bear against the same, so that when a fluid under pressure is supplied in the upper ends of the cylinders 14, the pistons 17 will be forced downwardly, and through the rods 15 will urge the member 3 downwardly and towards the platen 2. When the platen 2 is at its lowest position, this downward pressure will hold the member 3 against the nuts 5 on the guide rods 4.

The platen 2 is advanced and retracted in any suitable manner, but preferably hydraulically, and for this purpose it is provided with a depending piston 18 which enters a cylinder chamber in a base 19, and at its lower end terminates in an enlarged piston head 20. The periphery of the head 20 is provided with suitable packing 21 which prevents, or limits, the escape of operating fluid past the piston 20 in either direction. Preferably the packing 21 is in the form of split, metal rings which are disposed in annular grooves extending around the periphery of the head 20 in the manner of the metallic piston rings in internal combustion engines. Such rings are commonly made of spring steel, and split, with the ends at the split overlapping one another, so that when placed in the annular grooves, the rings automatically expand and bear tightly against the cylinder wall to prevent leakage of actuating fluid along such wall from one side of the piston head to the other. Inasmuch as piston rings mounted in this manner are so commonly employed in the pistons of internal combustion engines, they have been illustrated only diagrammatically in the drawings.

The portion of the chamber of the base 19 below the piston head 20 may be identified as an advancing chamber 22 and the corresponding part of the chamber above piston head 20 may be identified as a retracting chamber 23. Operating fluid is supplied to these chambers 22 and 23 to cause advance and retraction of the platen 2, and it will be noted that since the end face area on the head 20 within the retracting chamber is smaller than the effective base area at the opposite or lower face of the piston head 20, the greater face areas on the lower side of the piston head 20 will cause an upward movement of the platen 2, even though the same pressure per area is delivered at the same time to retracting chamber 23.

Operating fluid under pressure is obtained from any suitable source 24, and because of the high pressures employed, this may conveniently be a pump 24 of the variable delivery type. The pump 24 is continuously operating and withdraws the operating fluid, usually an oil, from a reservoir R, through a suction pipe 25. To simplify the piping in the diagram, a number of small reservoirs have been marked "R" and disposed at different positions on the diagram, but it will be understood that the reference "R" designates a common reservoir. The fluid under pressure from the pump 24 is delivered through a pipe 26 to a main control valve 27, but included in series in the pipe 26 is a suitable choke valve 28 which may be in the nature of a pressure relief valve opening at a relatively low pressure to pass fluid from the pump towards the valve 27, but insuring a minimum back pressure on the pump at all times.

Also included in the pipe 26 is a free check valve 29 which opens to pass fluid to the valve 27, but closes to prevent reverse flow. The valve 27 is provided with a valve element 30 which reciprocates endwise in a valve chamber 31, and the pipe 26 opens into the chamber 31 through a port 32. The valve element 30 has spaced lands 33 and 34, which are on opposite sides of the port 32. The land 33 bridges and closes a port 35 when the valve element 30 is in a neutral, intermediate position shown in full lines in Fig. 1, and when the valve element is in that position, the land 34 is aligned with an annular port 36. The land 34 is beveled so that when it is in alinement with the annular port 36, fluid from the inlet port 32 may pass around the land 34 and enter the pipe 37 leading to the reservoir R. The lower end of the chamber 31 is also connected to the pipe 37.

The valve element has an operating stem extending outwardly through one end of the housing of the valve 27, where an annular groove in its periphery receives pins on the forked end of an operating lever 38 which is pivotally supported at 39 on a bracket 40 of the valve 27. The lever 39 has an operating handle 41 by means of which the lever 38 may be rocked to shift the valve element 30 endwise in the chamber 3. Suitable means (not shown) may be provided for holding the lever 38 in its three possible positions. Inasmuch as means for holding a lever such as 38 releasably in different positions is well known, and is not per se a part of the invention, no showing thereof has been made.

The port 35 is connected by a pipe 42 to a passage 43 leading to the interior of the advancing chamber 22. The port 36 is connected by a pipe 44 to a pilot chamber 45 of a pilot operated check valve 46, having its check valve element 47 yieldingly closed, but opened by pressure in the pilot cylinder 45. Valves of this type are well known in the art. The chamber of the valve 46 below the head of the valve element 47 is connected by pipe 48 to reservoir R and the portion of the chamber of valve 46 at the top of the head of the valve element is connected by a pipe 49 to the advancing chamber 22.

When the ram is of the simple type, where the fluid under pressure is delivered at all times to the entire platen advancing chamber, the passage 43 opens directly into the chamber 22, but inasmuch as it is frequently desirable to have a rapid initial advance of the platen, and then, when resistance is encountered, a slower advance but with greater pressure area subjected to the fluid under pressure, a compound piston is sometimes employed for this purpose, and has been illustrated in the drawings. In such an instance, the free or outer end face of the piston head 20 is provided with a recess 50 which extends toward the platen 2 for a distance equal to or greater than the expected travel of the platen. A rod or stem 51 projects from the closed end of the cylinder base 19 into this recess 50, and the rod 51 terminates within the recess 50 in an enlarged head 52 which cooperates with a side wall of the recess 50 to form a piston head. The closed end of recess 50 forms an auxiliary platen advancing chamber 53.

The passage 43 extends endwise through the stem 51 to this chamber 53, which may be also termed a fast traverse, advancing chamber 53. Thus operating fluid from the pipe 42 passes directly to this chamber 53 and forces the platen 2 upwardly as rapidly as the chamber 53 can be filled with liquid from the pipe 42. The pipe 49 opens into the chamber 22 outside of the stem 51, so that as the platen 2 is elevated by fluid under pressure in chamber 53, the valve element 47 and valve 46 will be opened by the suction in the exterior area of the advancing chamber 22 and fluid from the reservoir R will be drawn through pipe 48 and pipe 49 into the annular outer chamber 22.

The pipe 42 extends beyond the passage 43 and opens into one zone of a chamber 54 of a valve 55, and a pipe 56 connects another zone of the chamber 55 with the pipe 49 leading to the large or outer end area of advancing chamber 22. The valve 55 is provided with a valve element 57 having spaced lands 58 and 59. When the valve element is in full line position shown in Fig. 1, the land 58 closes the inlet to pipe 56 and liquid entering the chamber 54 from the pipe 42 presses against the opposing faces of the lands 58 and 59 and causes no movement of the valve element. The escape of liquid entering chamber 54 through pipe 42 is prevented, so that there is no fluid flow through the valve chamber. The valve element 57 has an operating stem 60 which extends into a pilot chamber 61 and therein terminates in a piston head 62. Pipes 63 and 64 open into opposite ends of the chamber 61, at opposite sides of the head 62, so as to deliver fluid under pressure alternately to opposite ends of the chamber 61 and thus cause endwise movements of the valve element 57. The pipes 63 and 64 are connected to a valve 65 having a movable valve element 66, and which connects the pipes 63 and 64 alternately to a pipe 67 which is connected to the pipe 26 between the choke valve 28 and the pump 24.

The valve element 66, whenever it connects one of the pipes 63 or 64 to the pipe 67, automatically vents the other of those pipes 63 and 64 to a reservoir R by a pipe 68. The valve element 66 carries a pair of spaced operating fingers 69, which are engaged by an operating member 70 on the plate 2, so that when the platen reaches a predetermined position in its advance, the member 70 engages the fingers 69 and rocks the valve element 68 to interrupt the connection between pipes 64 and 67 and connects the pipe 67 to the pipe 63, at the same time venting the pipe 64. The platen may then continue its upward movement while the valve element 66 remains in the same position, and when the platen 2 passes this same position, on its downward or retracting stroke, the member 70 will rock the valve element 66 back into the position shown in full lines in Fig. 1, where pipe 67 is re-connected to pipe 64 and 63 is vented. Thus fluid under pressure is delivered through pipe 67, valve 65 and pipe 64, to the upper end of cylinder 61, where it forces the valve element 57 back into the full line position in Fig. 1.

When the platen reaches this selected position in its advance, which is selected to be that when substantial resistance is expected or just before injection piston 12 enters recess 11, the pressure in the upper end of the chamber 61 is released and pressure is supplied to the lower end of chamber 61, which moves the valve element 57 upwardly in Fig. 1, to cause the land 58 to uncover the opening to pipe 56, and thus connect the pipe 42 to the pipe 56 through the chamber 54. When this happens, fluid under pressure from the pump passes through pipe 42 into the fast traverse chamber 53, and also through the valve 55 into the larger, annular, advancing chamber 22. In this manner, the fluid is now applied to the entire free end area of the piston 20, and even with the pressure per unit area remaining the same, the increase in pressure area causes a proportionate increase in the total moving force exerted on the platen, but because of the larger space behind the piston 20 to be filled by fluid from the pipe 42 and the pump, the rate of advance will be slower. When the fluid under pressure is supplied through this pipe 56 to the larger end area of the chamber 22, some of the fluid will tend to flow backwardly through the pipe 49 to the check valve 46, and the latter will then close and prevent such backward flow.

Thus, when the handle 41 of the valve 27 is operated into the "advance" position as shown in Fig. 1, the land 34 moves between the ports 32 and 36 to interrupt fluid flow between them, and land 33 uncovers port 35. Fluid then passes from pipe 26 through the chamber 31, in the space between the lands 33 and 34, to the port 35, thence by pipe 42 to the passage 43, thence to fast traverse chamber 53. At the same time, the port 36 is in communication with the reservoir pipe 37 opening from the upper end of the chamber 31, so that there will be no fluid pressure in the pilot chamber 45 of the pilot operated, prefill valve 46.

As the platen 2 starts upwardly, the suction created in the outer, annular chamber 22 will cause the valve element 47 to open, and fluid will pass from the reservoir, through pipe 48, valve 46 and pipe 49 to the chamber 22 to fill it and permit continued upward advance of the platen at a relatively rapid rate determined by the capacity of the pump to fill the chamber 53 as the latter increases in size due to the upward advance of the platen. When a predetermined position is reached, the valve 55 will be operated to connect the pipe 42 to the pipe 56 and thus deliver fluid to the entire advancing area of the piston head 20, and valve 46 then automatically closes. The advance continues until the handle 41 is shifted to the neutral or reverse position. When the handle 41 is moved into the reverse position, the valve element 30 will be shifted to place the land 34 between the port 36 and the opening to pipe 37, and the land 33 will move above the port 35 so that the latter will then be in communication with the connection of pipe 37 to the lower end of chamber 31. Fluid may then escape from both advancing chambers 22 and 53 through the pipe 42, the fluid from the chamber 22 passing through the valve 55, all of the escaping operating fluid at this time passing through the valve 57.

When the valve element 30 is moved into this position, causing the release of pressure from the pipe 42, the port 32 is connected to the port 36, and the fluid under pressure from the pump 24 is then conducted through the valve 27 to the pipe 44 and pilot cylinder 45. As soon as the pressure in the chamber 22 has fallen sufficiently, the pressure in the pilot chamber 45 will force the check valve 46 open, so that fluid from the chamber 22 may then escape directly to the reservoir through valve 46 and pipe 48, as well as through pipe 42. The platen 2 then descends and when it passes the valve 65, it operates the latter to cause a movement of the valve element 57 back into the full line position shown in Fig. 1.

This interrupts the connection between the chambers 22 and 53 and thereafter all of the fluid from the chamber 53 escapes through the pipe 42 and the valve 27 back to the reservoir R, and the fluid then remaining in chamber 22 continues to escape through the open check valve 46. The platen then descends back to its normal position shown in full lines in Fig. 1. When the desired, retracted position of the platen is reached, the handle 41 is moved into the neutral position shown in full lines in Fig. 1, where the land 33 closes the port 35 and, by preventing further escape of fluid from chamber 53, stops the platen 2 in its descent. The fluid from the pump then passes idly back to the reservoir through the valve 27. This also vents the pipe 44 allowing the check valve 46 to close under the action of a light spring 71, or by gravity.

A pipe 72 connected at one end to the pipe 26 at a point between the choke 28 and valve 27, and at its outer end it opens through a port 73 in the chamber 74 of a valve 75. A valve element 76 is mounted to reciprocate in the chamber 74, and is provided with spaced lands 77 and 78. The valve element 76 is provided with an operating stem 79 which extends into a pilot cylinder 80 and there terminates in a piston head 81. The pilot cylinder 80 is at one end of the chamber 74 and the opposite end 82 of the chamber 74 is of greater cross sectional area than the chamber 80. A piston 83 is disposed in the end 82 of chamber 74 so as to reciprocate endwise and it carries a stem 84 which is engageable with a post 85 projecting endwise from the valve element 76. A spring 86 is disposed around the post 85 and acts between an abutment 87 and the land 78 to yieldingly and resiliently urge the valve element 76 into the full line position shown in Fig. 1, in which position there is a gap between the post 85 and the stem 84 on the piston 83.

A pipe 88 opens into the closed end of the piston chamber 82, behind the piston 83, and it is connected to the advancing chamber 22. The pipe 88 has in series therein a pressure relief valve 89, which opens in the direction of the arrow to pass fluid from the chamber 22 to the chamber 82 in the valve 75, when the fluid pressure in the chamber 22 is sufficient to open the pressure relief valve 89.

A pipe 90 opens into the closed end of the pilot cylinder 80, and in turn is connected to a valve 91 having operating fingers 92 on the rotor 93 thereof. When the rotor 93 is in the position shown in full lines in Fig. 1, it connects the pipe 90 with a vent pipe 94 running to the reservoir R. A pipe 95 connected to the pipe 72 also leads to a port in the valve 91, and when the rotor 93 is moved clockwise in Fig. 1, the passage 96 thereof will connect the pipe 90 to the pipe 95, so that fluid under pressure from the pump will be delivered behind the piston head 81 and will force the valve element 76 against the action of the spring 86, downwardly in Fig. 1, until the gap between the post 85 and the pin 84 is approximately closed.

A pipe 97 opens into the chamber 74 of the valve 75 at a point between the lands 77 and 78 when the valve element is in its full line position shown in Fig. 1, but immediately adjacent the land 77. The other end of the pipe 97 opens into the retracting chamber 23 of the ram operating the platen 2. The valve chamber 74, at a point above the land 77 when the valve element 76 is in the full line position shown in Fig. 1, opens into a vent pipe 98 leading to the reservoir R, and the upper end of piston chamber 82 is also connected to the vent pipe 98. When the valve element 76 is in the position shown in full lines in Fig. 1, the pipe 97 is connected through the valve chamber 74, in the space between the lands 77 and 78, to the port 73 so that fluid under pressure from the pump will pass through the valve chamber 74 and pipe 97 to the retracting chamber 23. The pipe 90 is then vented to reservoir, and the spring 86 holds the valve element 76 in the position shown in Fig. 1.

When the rotor 93 is given an angular movement clockwise in Fig. 1, the pipe 90 will be connected to pipe 95 and the fluid pressure from the pump will then force the valve element 76 downwardly against the action of the spring 86 and carry land 77 into the position shown by dash lines in Fig. 1, between the opening in the pipe 97 and the port 73, thus cutting off the flow of fluid from the pump to the retracting chamber 23 and venting the pipe 97 to the pipe 98. This releases fluid from the retracting chamber 23. The valve rotor 93 is operated in any suitable manner from the platen 2, but, for convenience, it is shown as operated by a finger 99 carried by the floatingly mounted member 3. When the platen 2 picks up the member 3 and they both move together toward the fixed head 1, the finger 99 will, at a selected point, engage between the fingers 92 and rock the rotor 93 into the position in which it connects pipes 90 and 95 and causes an operation of the valve element 76. The finger 99 then continues beyond the valve fingers 92 for the remainder of the stroke.

The pump may, if desired, have a drain pipe 100 leading to the reservoir R for delivering any slippage or leakage of liquid back to the reservoir, and the lower ends of the cylinders 14 may be connected together by a passage 101, and by a pipe 102 to reservoir R.

In order to relieve the pressure in the pipe 88 between the piston chamber 82 and the pressure relief valve 89, I have provided suitable means for the escape of fluid which has passed the pressure relief valve 89, in order to permit return of the piston 83 to its lower position in Fig. 1. In Fig. 1 a bleeder valve 103 is shown as connected to the pipe 88 between the valves 75 and 89 so as to drain slowly into reservoir R, the operating fluid which has passed the pressure relief valve 89.

The upper or closed ends of the cylinders 14 are connected to one another by a pipe 104 and the latter by a pipe 105 to the pipe 72, so that fluid under pressure from the pump 24 will at all times be delivered to the upper or closed ends of the cylinders 14 and urge the member 3 yieldingly towards the platen 2. If desired, the pump 24 may be of the type which sets itself to approximately neutral delivery position automatically when a predetermined pressure is reached, so as to maintain that pressure for any desired interval of time. A pump of that type is useful with this apparatus when molding resins, because after the resinous material has been liquefied in the mold, it may be desirable to maintain the pressure on the resin in the mold in order that the liquid resinous material will continue to fill the mold while being hardened. In pumps of this type, the yoke 106 is shifted to vary the rate of delivery of the pump by a lever 107 pivoted at 108 to the pump frame.

A spring device 109 is connected to the lever 107, and yieldingly and resiliently urges it in a direction to cause maximum delivery of the pump. The stress of the spring device 109 determines the fluid pressure which must be reached by the pump before the lever 107 can be operated to decrease the rate of delivery of the pump, and this stress may be adjusted by a hand wheel 110 in a manner well known in the art. A pilot cylinder 111 is also provided on the pump, and a piston 112 reciprocating therein bears against the lever 107 so as to operate the lever 107 against the action of the spring device 109 and decrease the rate of delivery of the pump. The closed end of the pilot cylinder 111 is connected by a pipe 113 to the pipe 56 leading to the chamber 22, so that when the pressure in this larger advancing chamber 22 is sufficient to overcome the spring device 109, the piston 112 will be forced in an outward direction to rock the lever 107 and, through it, shift the yoke 106 until the delivery of the pump is just sufficient to compensate for leakage and maintain on the fluid delivered to the advancing chamber 22 the pressure for which the spring device 109 is set.

The operation of the apparatus shown diagrammatically in Fig. 1 is believed to be clear from the foregoing description, but will be briefly summarized.

Assuming that the parts are in the relative positions shown in Fig. 1, which is the normal inactive position of the press, the fluid delivered by the pump will pass through the pipe 26, valve 27 and pipe 37 to reservoir R, thence back by pipe 25 to the pump. The attendant places a quantity of molding material in the recess 11 in the member 3 of the press, and then operates the lever handle 41 to rock the lever 38 into the "advance" position shown in Fig. 1, which places the land 34 of valve 27 between the ports 32 and 36 so as to interrupt fluid flow between them, and to uncover the port 35 and connect it to the port 32 by the space between the lands 33 and 34. When the valve element 30 is in this position, it vents the pipe 44 to the reservoir through the pipe 37, and the fluid under pressure from the pump 24 will pass through pipe 26 to the valve chamber 31, thence through port 35 and pipe 42 and passage 43 to the small advancing chamber 53. The pressure in the chamber 53 forces the platen 2 upwardly or in advancing direction, and the suction created in the chamber 22 causes an opening of the pilot operated, free check valve 46 to draw operating fluid from the reservoir through pipe 48 and pipe 49 into the chamber 22.

While the press was idle, fluid under pressure was, of course, delivered through the pipes 26 and 72, and valve 75 and pipe 97 to the retracting chamber 23. The platen would now advance, however, because the pressure area in the chamber 53 is greater than the pressure area in the retracting chamber 23, and the operating fluid from the chamber 23 is displaced through the valve 75 and pipe 72 to the pipe 26 where it passes with the fluid from the pump 24 to the advancing chamber 53. As the platen 2 advances the mold section 7 will engage the mold section 6 and close the mold, and then the platen 2 will carry the floatingly supported member 3, with it. Shortly after the member 3 is picked up in this manner, the finger 99 will rock the rotor 93 of valve 91 into the position in which it connects pipes 90 and 95, whereupon the fluid under pressure forces valve element 76 into the position in which it disconnects the source of fluid from the pump to the retracting chamber 23 and vents the latter through the pipe 98.

The chamber 53 is large enough to also overcome the opposing pressure exerted in the cylinders 14, and as soon as the retracting chamber 23 is vented, the platen 2 and member 3 will advance with less opposition until the injecting piston 12 is about to enter the recess 11, at which time, the finger 70 will operate valve 65 and through it cause operation of the valve element 57 to connect the pipes 42 and 56, whereupon fluid from the pump will also pass directly to the advancing chamber 22. The platen 2 will then advance more slowly, but with larger, effective pressure area, and as the member 3 moves upwardly the piston 12 will first compress the molding material in the recess 11 and force it through the passage 13 into the mold. When the molding material is a thermosetting resin, it has heretofore been supplied to the recess 11 in powder form, and in that case the member 3 is heated around the recess 11 so as to liquefy the material and enable it to be forced through the passage 13 into the mold cavity.

When the pressure in the advancing chamber 22 becomes substantial, it opens the pressure relief valve 89 and fluid then passes into the piston chamber 82 to operate piston 83 in a direction to force the valve element 76, against the pressure exerted thereon by the pilot piston 81, back into the full line position shown in Fig. 1. This re-connects the pump to the retracting chamber 23, but the advance of the platen 2 continues until the pressure in chamber 22, as communicated through pipes 56 and 113 to the pilot cylinder 111 of the pump, sets the pump for just sufficient delivery to maintain the pressure for which the spring device 109 is set.

This will maintain the selected, but adjustable, pressure on the molding material in the recess 11 and in the mold cavity until the operator desires to reverse the press and open the mold. To do this, the operator rocks the lever 38 into the position designated "reverse," which carries the land 34 into a position between the port 36 and the opening into the pipe 37 at the upper end of the valve chamber 31, and places the land 33 above the port 35 but below port 32 so as to vent the pipe 42, to the pipe 37. This connects the pipe 26 from the pump to the pipe 44, and places the pump pressure on the pilot cylinder of the check valve 46, tending to open it. The valve 46, however, will not open until the pressure in the advancing chamber 22 has fallen sufficiently, and ince the pipe 42 is at this time vented through he lower part of chamber 31, liquid will escape rom advancing chambers 22 and 53 through the pipe 42. As soon as sufficient fluid has escaped to lower the pressure in chambers 22 and 53, the check valve 46 will automatically open and thereafter fluid may escape from chamber 22 through pipe 49, check valve 46 and pipe 48 back to reservoir without passing through the valve 27.

When the pressure in advancing chambers 22 and 53 falls, the pressure in the retracting chamber 23 which had previously been applied, will now tend to retract the platen 2, aided by the pressure of the operating fluid in the cylinders 14. The pressure in cylinders 14 will hold the member 3 against the platen so as to release the piston 12 from the recess 11 while keeping the mold sections 6 and 7 in contact. The hardened resin in the passage 13 must be broken off at the small end of passage 13, and it usually strips from the recess 11. When this release occurs, there is no jumping of the member 3 because it has been held against the platen 2 during all of this part of the descent, and consequently, there is no danger of damage to the mold sections 6 and 7.

During the descent of the platen, the finger 70 will operate the valve 65 back into its former position and cause a return of the valve element 57 to the full line position in Fig. 1, which disconnects the chamber 22 from the pump 24, but this does not prevent escape of fluid from the chamber 22. Thus, the fluid escapes from chamber 22 now through the check valve 46, which is held open by the pressure in the pilot cylinder 45. After the piston 12 has been released from recess 11, the finger 99 will operate the valve 91 to vent the pipe 90, and the spring 86 will hold the valve element 76 in the same position, so that the pressure in the retracting chamber 23 will continue throughout the entire descent of the platen. This completes the cycle of operation of the apparatus.

It will be noted that during an advance of the platen, when the pressure in the advancing chamber 22 began to be substantial the pressure relief valve 89 opened, and the piston 83 forced the valve element 76 back into the full line position of Fig. 1 to reapply the pump pressure per unit area on opposite sides of the piston head 20 and under such circumstances, there was no pressure differential which would tend to cause operating fluid to pass the packing 21 and hence there could be no wire drawing or injury to the packing or packing rings 21 under any high pressures to which the platen was subjected during molding operation. This pump pressure, however, is not applied to the retracting chamber 23 after an initial advance, until the pressure advancing the piston becomes high enough to cause danger of injury to the packing 21, and then the fluid is supplied to chamber 23 automatically in response to the pressure in the chamber 22 for the rest of the advancing stroke.

In Fig. 2, a modification of the apparatus shown in Fig. 1 is included. The apparatus is generally the same as in Fig. 1 with the exception of certain changes which will be pointed out, and the parts in Fig. 2 which correspond to parts in Fig. 1 are given the same reference characters.

In Fig. 2, a free check valve 114 which is connected in parallel across the pressure relief valve 89 and opens in the opposite direction from the valve 89 is substituted in place of the bleeder valve 103. This valve 114 closes automatically to prevent flow therethrough in a direction away from the advancing chamber 22, but opens freely to pass fluid toward the chamber 22. Thus, all fluid trapped in the pipe 88 can flow back into the chamber 22 as soon as the pressure in the latter falls during the retraction of the platen. It will be understood that this check valve 114 connected in this manner may be substituted for the bleeder valve 103 in Fig. 1, and that the bleeder valve 103 and its connection to reservoir R may be substituted for the check valve 114, because both are equivalents in the art for this purpose.

In place of the cylinders 14 and piston rods 15 which hold the member 3 against the platen during the descent, I have substituted a mechanical latch device for preventing any substantial opening of the mold until after the injection piston 12 has been withdrawn from the recess 11. To accomplish this, one or more latches 115 (one only being shown) are hinged by pins 116 on bearings 117 carried by the platen 2, and each latch 115 has a latch nose 118 adapted to engage somewhat loosely over the member 3, as shown by dash lines in Fig. 2.

A spring 119 urges each lever 115 into the latching position shown in dash lines in Fig. 2. The lever 115 is provided with a laterally extending arm 120 in a position to engage a laterally extending end or trip 121 on a bracket 122 on the cylinder base 19. As the platen 2 descends, the arm 120 will engage the trip 121, after the piston 12 has been withdrawn from the recess 11, and then continued descent of the platen 2 will cause a rocking of the arm 120 and through it a rocking of the latch lever 115 into the disengaged position shown in full lines in Fig. 2. This allows the platen 2 to continue its descent free of member 3. The latch 115 is, however, disengaged from the member 3 before the member 3 engages the stops 5 on the rods 4.

When the platen 2 advances, it will pick up the member 3, and the two will move together upwardly and after they have become engaged and have moved upwardly to some extent, the arm 120 will be released gradually by the trip 121, and spring 119 will rock lever 115 into latching position shown by dash lines in Fig. 2. The latching condition will continue during the rest of the advance of the platen and also during descent of the platen, after a molding operation, until arm 120 again strikes the trip 121 and the latch 115 will be disengaged from the member 3 before the member 3 engages the nuts 5. The latch 115 can, and preferably does, loosely engage the member 3 so that there will be no binding that might prevent an unlatching of the mold sections at the proper time. The operation of the apparatus shown in Fig. 2 is otherwise the same as explained for Fig. 1.

In both of the embodiments of the invention shown in Figs. 1 and 2, the cross sectional area of the recess 11 is greater than the corresponding cross sectional area of the mold cavity. To put it another way, the area of the mold cavity is less than the cross sectional area of the recess 11, when the area of the cavity is measured in a plane approximately parallel to the cross sectional plane of the recess 11. Since the pressure per unit area will be the same both in the recess 11 and in the mold cavity, by making the effective pressure area in the mold cavity, considered crosswise of the direction of the travel of the platen, less than that in the recess 11, the pressure in the mold will not open the mold and cause flash. For that reason, it is not necessary to clamp the mold sections 6 and 7 tightly together. The pressure on the molding material in recess 11 of the member 3 will hold member 3 against the platen 2 and keep the mold closed under all pressures to which the molding material in the recess 11 may be subjected. The latch 115 for this reason, can loosely engage the member 3 so that there will be no binding that will interfere with this disengagement at any time.

It will be understood that various changes in the details and arrangements of parts, which have been herein described and illustrated in order to explain the nature of the invention, may be made by those skilled in the art within the principle and scope of the invention as expressed in the appended claims.

I claim:

1. In hydraulic apparatus of the type employing a fixed head, and a platen movable toward and from said head and operated by a ram with packing means and an advancing chamber and a retraction chamber on opposite sides of said packing for causing movements of said platen in opposite directions, the improved hydraulic circuit for operating said ram, which comprises a source of actuating fluid under pressure, conduit means connecting said source and said advancing chamber of said ram, a valve in said connecting means and having a valve element operable into a plurality of positions in one of which it connects said source to said advancing chamber and in another of which it connects said advancing chamber to exhaust, a connection from said source directly to said retraction chamber and having an auxiliary valve in series therein, said last named valve having a valve element movable between two positions in one of which it connects said source to said retracting chamber and in the other of which it connects said retracting chamber to exhaust, means yieldingly urging said auxiliary valve element into said one position, pilot operated means for urging said auxiliary valve element into the other of said positions, a control valve controlling said pilot operated means and operable by said platen during an advance of said platen to cause movement of said auxiliary valve member into said other position at a selected point in the advance of said platen, a hydraulic device operable on said auxiliary valve element to force it into said one position against the action of said pilot operated means, a conduit connecting said hydraulic device to said advancing chamber, and a pressure relief valve in series with said conduit and opening to pass fluid from said advancing chamber to said hydraulic device when the pressure exceeds a predetermined pressure.

2. In hydraulic apparatus of the type employing a fixed head, a platen movable toward and from the head, and a ram connected to the platen for operating the platen in opposite directions and which ram includes a piston head with packing, a cylinder in which said piston head reciprocates and along the wall of which said packing moves, and advancing and retracting chambers on opposite sides of said piston head, the improved hydraulic circuit for operating the ram which comprises a source of actuating fluid under pressure and connected to both of said chambers, a separate valve controlling the delivery of fluid from said source to each chamber and the release of fluid from each chamber, said valve for controlling the delivery of fluid to said retracting chamber having a valve element operable into one position to connect said source to said retracting chamber and into another position to disconnect said flow of fluid from said source to said retracting chamber and to vent said retracting chamber, means continuously urging said valve element into said one position, a hydraulic device operable to force said valve element into said another position, a second hydraulic device for operating said valve element into said one position, a conduit connecting said pressure advancing chamber to said second hydraulic device, a pressure relief valve in said conduit and opening to pass fluid from said advancing chamber to said second hydraulic device when the pressure in said advancing chamber exceeds a predetermined pressure, means for releasing fluid from said second hydraulic device while said pressure relief valve is closed, and means operable by said platen during an advance for rendering said first hydraulic device effective to move said valve element to said another position.

3. In hydraulic apparatus of the type employing a fixed head, a platen movable toward and from the head, and a ram connected to the platen for operating the platen in opposite directions and which ram includes a piston head with packing, a cylinder in which said piston head reciprocates and along the wall of which said packing moves, and advancing and retracting chambers on opposite sides of said piston head, the improved hydraulic circuit for operating the ram which comprises a source of actuating fluid under pressure, means for connecting said source to said advancing chamber and for venting said advancing chamber to cause advances and retractions of said platen, a conduit connecting said source to said retracting chamber, a valve connected in series in said conduit and having a valve element therein movable between two positions, in one of which it connects said source to said retracting chamber and in the other of which it disconnects said source from said retracting chamber and vents that chamber, means yieldingly urging said valve element into said one position, means rendered effective by said platen at a selected point in its advance for causing movement of said valve element into said other position, and means responsive to pressure in said advancing chamber for forcing said valve element against the action of said first moving means into said one position while the pressure in said advancing chamber exceeds a predetermined pressure.

4. A hydraulic circuit for controlling a motor of the type having a ram operated platen with ram advancing and retraction chambers on opposed sides of a piston head carried by the platen, which comprises a source of actuating fluid under pressure, means for delivering fluid from said source to said advancing chamber, for interrupting such delivery and preventing escape of fluid from said advancing chamber, and for releasing fluid from said advancing chamber to permit return of said platen, means normally operable for connecting said source to said retraction chamber while said platen is in an initial portion of the platen advancing stroke and during all of its retracting stroke, and for disconnecting said source from said retracting chamber and venting the latter during the other portion of the platen advancing stroke, and means operable during said other portion of said advancing stroke for connecting said source to said retraction chamber while the pressure in said advancing chamber is above a predetermined pressure.

5. A hydraulic circuit for controlling a motor of the type having a ram operated platen with ram advancing and retracting chambers on opposed sides of a piston head carried by the platen, which comprises a source of actuating fluid under pressure, means for delivering fluid from said source to said advancing chamber, for interrupting such delivery and preventing escape of fluid from said advancing chamber, and for releasing fluid from said advancing chamber to permit return of said platen, means normally operable for connecting said source to said retraction chamber while said platen is in an initial portion of its advancing stroke and during all of its retracting stroke, and for disconnecting said source from said retracting chamber and venting the latter during the other portion of the platen advancing stroke, and means automatically responsive to the pressure in said advancing chamber for causing the connection of said source to said retracting chamber during said other portion of the travel of said platen solely while the pressure in said advancing chamber is above a predetermined pressure.

6. Controlling means for a hydraulic press of the type having a fixed head, a ram operated platen with advancing and retracting chambers causing advance and retraction of said platen, and an intermediate pressure member floatingly mounted between said head and platen for movement in the same direction as said platen, comprising hydraulic means connected to said member to force said member toward said platen, stop means limiting the movement of said member towards said platen to an extent less than the movement of said platen, a source of actuating fluid under pressure, a connection from said source to said hydraulic means, means operable selectively for connecting said source to said advancing chamber to cause an advance of said platen, for interrupting such connection and preventing release of fluid from said advancing chamber, and for releasing fluid from said advancing chamber while said source remains disconnected from said advancing chamber, a conduit connecting said source and said retraction chamber, a valve in series in said conduit for controlling fluid flow and having a valve element operable when in one position to connect said source to said retracting chamber, and when in another position to disconnect said source from said retracting chamber and to release fluid from said retracting chamber, means controlled by said member during its travel with said platen toward said fixed head for operating said valve element into said another position while said member is beyond a predetermined position during the advance movement of said member, and means automatically responsive to pressure in said advancing chamber for forcing said valve element into said one position while said member is beyond said predetermined position whenever said pressure in the advancing chamber is above a predetermined pressure.

7. Controlling means for a hydraulic motor of the type having a head, a platen movable toward and from the said head and urged yieldingly in a direction away from said head, and a ram connected to the platen for reciprocating it and having a piston portion with advancing and retracting chambers on opposite sides of said piston portion and with packing on said piston portion between said chambers, which comprises means selectively operable for delivering actuating fluid under pressure to said advancing chamber for causing an advance of said platen toward said head, for interrupting said connection and preventing escape of fluid from said advancing chamber to hold the platen in any position, and for releasing fluid from said advancing chamber to permit retraction of said platen, and means automatically responsive to the fluid pressure in said advancing chamber for causing the delivery of actuating fluid under substantially the same pressure as that in said advancing chamber to said retracting chamber while the fluid pressure in said advancing chamber is above a selected pressure, after an initial advance of said platen of selected extent.

8. Controlling means for a hydraulic motor of the type having a head, a platen movable toward and from the said head and urged yieldingly in a direction away from said head, and a ram connected to the platen for reciprocating it and having a piston portion with advancing and retracting chambers on opposite sides of said piston portion and with packing on said piston portion between said chambers, which comprises means selectively operable for delivering actuating fluid under pressure to said advancing chamber for causing an advance of said platen toward said head, for interrupting said connection and preventing escape of fluid from said advancing chamber to hold the platen in any position, and for releasing fluid from said advancing chamber to permit retraction of said platen, means for delivering fluid under pressure to said retraction chamber but operable normally for interrupting delivery of fluid under pressure to said retracting chamber and venting that chamber during said advancing movement after an initial advance while the pressure in said advancing chamber is below a selected pressure, and means automatically responsive to the fluid pressure in said advancing chamber for causing the delivery of actuating fluid under substantially the same pressure as that in said advancing chamber to said retracting chamber while the fluid pressure in said advancing chamber is above a selected pressure, after said initial advance.

9. A hydraulic circuit for controlling a motor of the type having a ram operated platen with ram advancing and retraction chambers on opposed sides of a piston head carried by the platen, which comprises a source of actuating fluid under pressure, means for delivering fluid from said source to said advancing chamber, for interrupting such delivery and preventing escape of fluid from said advancing chamber, and for releasing fluid from said advancing chamber to permit return of said platen, a connection from said source to said retraction chamber, valve means in said connection and operable to connect said retraction chamber alternately to said source and to exhaust, means controlled by the travel of said platen for causing operation of said valve means to connect said source to said retraction chamber during a selected initial portion of the advance of said platen and to connect said retraction chamber to exhaust during the remainder of the advance of said platen, and means automatically responsive to the pressure of said source in said advancing chamber for also operating said valve means to connect said source to said retraction chamber whenever the pressure in said advancing chamber is above a predetermined pressure.

10. A hydraulic circuit for controlling a motor of the type having a ram operated platen with ram advancing and retraction chambers on opposed sides of a piston head carried by the platen, which comprises a source of actuating fluid under pressure, means for delivering fluid from said source to said advancing chamber for interrupting such delivery and preventing escape of fluid from said advancing chamber, and for releasing fluid from said advancing chamber to permit return of said platen, a connection from said source to said retraction chamber, valve means in said connection and operable to connect said retraction chamber alternately to said source and to exhaust, means for normally operating said valve means to disconnect said source from said retraction chamber and connecting the latter to exhaust during at least the latter part of the advancing travel of said platen, and means automatically responsive to the pressure of said source in said advancing chamber for also operating said valve means to connect said source to said retraction chamber whenever the pressure in said advancing chamber is above a predetermined pressure.

11. In the controlling means for a hydraulic system of a hydraulic motor of the type having advancing and retraction chambers, a ram element operated in opposite directions by fluid pressures in said chambers, a source of fluid under pressure, and a connection from said source to each of said chambers, that improvement which comprises a valve device in each of said connections, means for operating the valve device in the connection to said advancing chamber to control the fluid pressure in that chamber, means for operating the other of said valve devices to connect the retraction chamber alternately to said source and to exhaust, a piston operable into and out of a position to prevent movement of said valve device in a manner to connect said retraction chamber to exhaust, a cylinder in which said piston reciprocates, a conduit connecting said cylinder to said advancing chamber, a pressure relief valve in said conduit for passing fluid from said advancing chamber to said cylinder, to move said piston into its said position when the fluid pressure in said advancing chamber is above a selected pressure, and means for releasing fluid pressure in said cylinder, whereby release of fluid pressure in said retraction chamber to exhaust is possible only while the pressure in said advancing chamber is below a selected pressure for which said pressure relief valve is set.

12. In a hydraulic system for a hydraulic motor of the type having advancing and retraction chambers, a ram element operated in opposite directions by fluid pressures in said chambers, a source of fluid under pressure, and a connection from said source to each of said chambers, that improvement which comprises a separate valve in each of said connections, and individually operable to connect the chamber in that connection, alternately to said source and to exhaust, means controlled by the travel of the ram for operating the valve in the connection to the retraction chamber, to connect the retraction chamber to exhaust when said ram is in a selected zone of its travel, a hydraulically operated device disposed for movement into a position where it prevents movement of said valve in said connection to said retraction chamber in a manner to connect the retraction chamber to exhaust, said hydraulically operated device being responsive to the pressure in said advancing chamber, and operable, by the fluid pressure in said advancing chamber, into its said position whenever the fluid pressure in said advancing chamber is above a selected pressure.

13. In a hydraulic system for a hydraulic motor of the type having advancing and retraction chambers, a ram element operated in opposite directions by fluid pressures in said chambers, a source of fluid under pressure, and a connection from said source to each of said chambers, that improvement which comprises a separate valve in each of said connections, and individually operable to connect the chamber in that connection, alternately to said source and to exhaust, pilot operated means for yieldingly urging said valve in said connection to said retraction chamber into a position to connect that chamber to exhaust, a valve controlling said pilot operated means and disposed in a position for operation by said ram, while said ram is traveling in a selected zone, a hydraulically operated device disposed for movement into a position where it prevents movement of said valve in said connection to said retraction chamber in a manner to connect the retraction chamber to exhaust, said hydraulically operated device being responsive to the pressure in said advancing chamber, and operable, by the fluid pressure in said advancing chamber, into its said position whenever the fluid pressure in said advancing chamber is above a selected pressure.

14. In a hydraulic system for a hydraulic motor of the type having advancing and retraction chambers, a ram element operated in opposite directions by fluid pressures in said chambers, a source of fluid under pressure, and a connection from said source to each of said chambers, that improvement which comprises a separate valve in each of said connections, and individually operable to connect the chamber in that connection, alternately to said source and to exhaust, means controlled by the travel of the ram for operating the valve in the connection to the retraction chamber, to connect the retraction chamber to exhaust when said ram is in a selected zone of its travel, a hydraulically operated device disposed for movement into a position where it prevents movement of said valve in said connection to said retraction chamber in a manner to connect the retraction chamber to exhaust, a conduit connecting said hydraulically operated device to said advancing chamber, a pressure relief valve in said conduit for passing operating fluid to said hydraulically operated device from said advancing chamber, whenever the fluid pressure in that chamber exceeds a predetermined pressure, and means for relieving said hydraulic device of fluid pressure, to enable said hydraulically operated device to release the valve in the connection to said retraction chamber.

15. In a hydraulic system for a hydraulic motor of the type having advancing and retraction chambers, a ram element operated in opposite directions by fluid pressures in said chambers, a source of fluid under pressure, and a connection from said source to each of said chambers, that improvement which comprises a separate valve in each of said connections, and individually operable to connect the chamber in that connection, alternately to said source and to exhaust, a pilot operated device for moving the valve in the connection to the retraction chamber into a position to connect that chamber to exhaust, a pipe connecting said pilot operated device to said source, a valve in that pipe for alternately connecting said pilot operating device to said source and to exhaust, a hydraulically operated device having a piston disposed for movement into and out of a position in which it prevents movement of the valve in the connection to the retraction chamber by said pilot operated device, and responsive to the pressure in said advancing chamber for movement into said position whenever the pressure in said advancing chamber is above a selected pressure, said piston being of greater effective area than said pilot operated device, whereby when said hydraulically operated device and said pilot operated device are both connected to said source at the same time, said piston will overcome said pilot operating device, and move the valve in the connection to the retraction chamber to connect that chamber to said source and hold it in that position against the action of said pilot operated means.

THOMAS F. STACY.